US009518709B2

(12) United States Patent
Wang et al.

(10) Patent No.: US 9,518,709 B2
(45) Date of Patent: Dec. 13, 2016

(54) LIGHTING ARTICLE COMPRISING EMBEDDED LED STRIP AND METHOD THEREOF

(71) Applicants: Zhaowei Wang, Ningbo (CN); Haisheng Tang, Ningbo (CN)

(72) Inventors: Zhaowei Wang, Ningbo (CN); Haisheng Tang, Ningbo (CN)

(73) Assignee: NINGBO SUNTEC LIGHTING CO., LTD, Xiang Shan County (CN)

( * ) Notice: Subject to any disclaimer, the term of this patent is extended or adjusted under 35 U.S.C. 154(b) by 207 days.

(21) Appl. No.: 14/320,624

(22) Filed: Jun. 30, 2014

(65) Prior Publication Data
US 2015/0077985 A1    Mar. 19, 2015

(51) Int. Cl.
| B29K 105/00 | (2006.01) |
| F21S 4/00 | (2016.01) |
| F21V 19/00 | (2006.01) |
| B29C 39/10 | (2006.01) |
| B29K 101/12 | (2006.01) |
| B29L 31/00 | (2006.01) |

(52) U.S. Cl.
CPC ............... F21S 4/008 (2013.01); F21K 9/20 (2016.08); F21S 4/28 (2016.01); F21V 19/002 (2013.01); *B29C 39/10* (2013.01); *B29K 2101/12* (2013.01); *B29K 2105/0058* (2013.01); *B29L 2031/747* (2013.01)

(58) Field of Classification Search
None
See application file for complete search history.

(56) References Cited

U.S. PATENT DOCUMENTS

| 4,271,458 A | 6/1981 | George |
| 4,885,664 A | 12/1989 | Hermanson |
| 6,478,450 B1 | 11/2002 | Grajcar |
| 7,641,355 B2 | 1/2010 | Lau |
| 7,685,753 B2 | 3/2010 | Slowski |
| 2002/0036908 A1* | 3/2002 | Pederson ............. B60Q 1/2611 362/545 |
| 2002/0113244 A1* | 8/2002 | Barnett ..................... F21S 4/28 257/98 |
| 2002/0145392 A1 | 10/2002 | Hair et al. |
| 2003/0112627 A1 | 6/2003 | Deese |
| 2005/0168973 A1 | 8/2005 | Chuang |
| 2010/0097791 A1 | 4/2010 | Chang |
| 2012/0000104 A1 | 1/2012 | Peeters et al. |
| 2012/0002417 A1* | 1/2012 | Li ......................... F21V 17/007 362/249.02 |
| 2014/0001500 A1 | 1/2014 | Tsai |
| 2014/0191648 A1* | 7/2014 | Lin ......................... F21K 9/135 313/116 |

* cited by examiner

*Primary Examiner* — Sharon Payne
(74) *Attorney, Agent, or Firm* — United States Research and Patent Firm; Guosheng Wang

(57) ABSTRACT

The present invention provides a lighting article such as holiday decorations and lamps e.g. a glowing Santa Claus, and a method of preparing such articles. The lighting article comprises an elongated structure resembling an image such as Santa. A solid matrix embedded with a LED strip is fitted into a groove in the elongated structure. The light emitted from the strip irradiates upon the elongated structure, and makes Santa Claus shining.

18 Claims, 6 Drawing Sheets

LIGHTING ARTICLE COMPRISING EMBEDDED LED STRIP AND METHOD THEREOF

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention claims a Paris Foreign Priority based on Chinese Patent Application 2013206890205, which was filed Sep. 16, 2013, and the disclosure of which is incorporated herein in its entirety.

The present invention relates generally to lighting articles such as holiday decorations and lamps e.g. a glowing Santa Claus, and more particularly to lighting articles comprising an embedded LED strip, and a method of preparing such articles.

BACKGROUND OF THE INVENTION

Flexible LED strips have been used for the purpose of illumination and decoration. For example, LED strips are attached to the surface of a frame which takes various shapes such as Santa Claus. However, there are two problems associated with such a design. First, the attachment of the LED strip to the frame surface is difficult to be automated, and therefore the manufacture process is complex, labor intensive and time-consuming. Second, the lighting effect and visual appearance of the design is unsatisfactory. For example, when the LED strip lights up, what a viewer can observe is a cluster of glaring "LED spots" or "bright spots" and a dimmed image of Santa Claus. The viewer cannot see a vivid Santa Claus that is per se "glowing" solidly and brightly. Therefore, there exists a need in the field to design a lighting article such as Santa Claus with improved optical properties, including more homogenous distribution of photons within the frame, enhanced brightness of the "glowing" Santa Claus per se, and less perception of glaring LED spots. There also exists a need in the field to design a manufacturing process that is simple, automatable, and highly efficient.

Peeters et al have disclosed a LED strip for the illumination of channel signs in US Published Patent Application 2012/0000104. To mount a flexible LED strip in a channel sign, a clip needs to be attached to an interior surface of the channel sign. Then an end of the LED strip is manually folded back and the LED strip including the folded end is manually fixated using the clip. However, such a process is defective in that it is complex, labor intensive, and time-consuming, and therefore cannot be automated.

U.S. Pat. No. 6,478,450 to Grajcar discloses a lighting system for channel signs comprising a flexible conductor strip that can be mounted to a structure of a channel sign and to which light sources, e.g., LEDs, can be electrically connected. The disadvantages of such a lighting system are that (1) it is difficult to make it waterproof, and (2) a viewer still suffers the observation of glaring "bright spots".

U.S. Pat. No. 4,271,458 to George discloses a decorative light tube. The tube houses unbased miniature lamps. The lamps are connected in series by soldering or welding the ends of the flexible wire leads together to form parallel strings between a pair of elongated parallel wire conductors. The tube is substantially filled with mineral oil or other clear, viscous dielectric fluid to protect the lamps and wiring against the adverse effects of vibration, shock and moisture. The disadvantages of George's tube are that (1) mineral oil or other clear, viscous dielectric fluid can have leakage problem, and cannot give the lamps a robust protection; and (2) a viewer still suffers the observation of glaring "bright spots".

Advantageously, the present invention can solve at least one of the above problems by employing an elongated structure having a groove along the elongation direction, into which a solid matrix embedding a LED strip is fitted.

SUMMARY OF THE INVENTION

One aspect of the invention provides a lighting article comprising (1) an elongated structure (or carrier) having a groove along the elongation direction, (2) a solid matrix fitted into the groove, wherein 60-98% percent of the surface area of the solid matrix is chemically bonded to the elongated structure, and (3) a light-emitting strip embedded in the solid matrix. The light-emitting strip comprises two or more light-emitting diodes each of which is encapsulated with an encapsulant. The light refractive indexes of the elongated structure, the solid matrix and the encapsulant are $R1$, $R2$ and $R3$ respectively, $R2 \neq R1$, and $R2 \neq R3$.

Another aspect of the invention provides a process of producing a lighting article, which comprises the following steps:

(i) providing an elongated structure having a groove along the elongation direction;

(ii) placing a light-emitting strip inside the groove, wherein the light-emitting strip comprises two or more light-emitting diodes each of which is encapsulated with an encapsulant;

(iii) filling the groove with a liquid material so that the light-emitting strip is immersed in the liquid material; and (iv) solidifying the liquid material into a solid matrix so that the light-emitting strip is embedded in the solid matrix, and the solid matrix is fitted into the groove with 60-98% percent of its surface area being, chemically bonded to the elongated structure.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts Which are necessary in order to elucidate the invention. For simplicity and clarity of illustration. elements shown in the figures and discussed below have not necessarily been drawn to scale. Well-known structures and devices are shown in simplified farm such as block diagrams in order to avoid unnecessarily obscuring the present invention. Other parts may be omitted or merely suggested.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Figure 1:
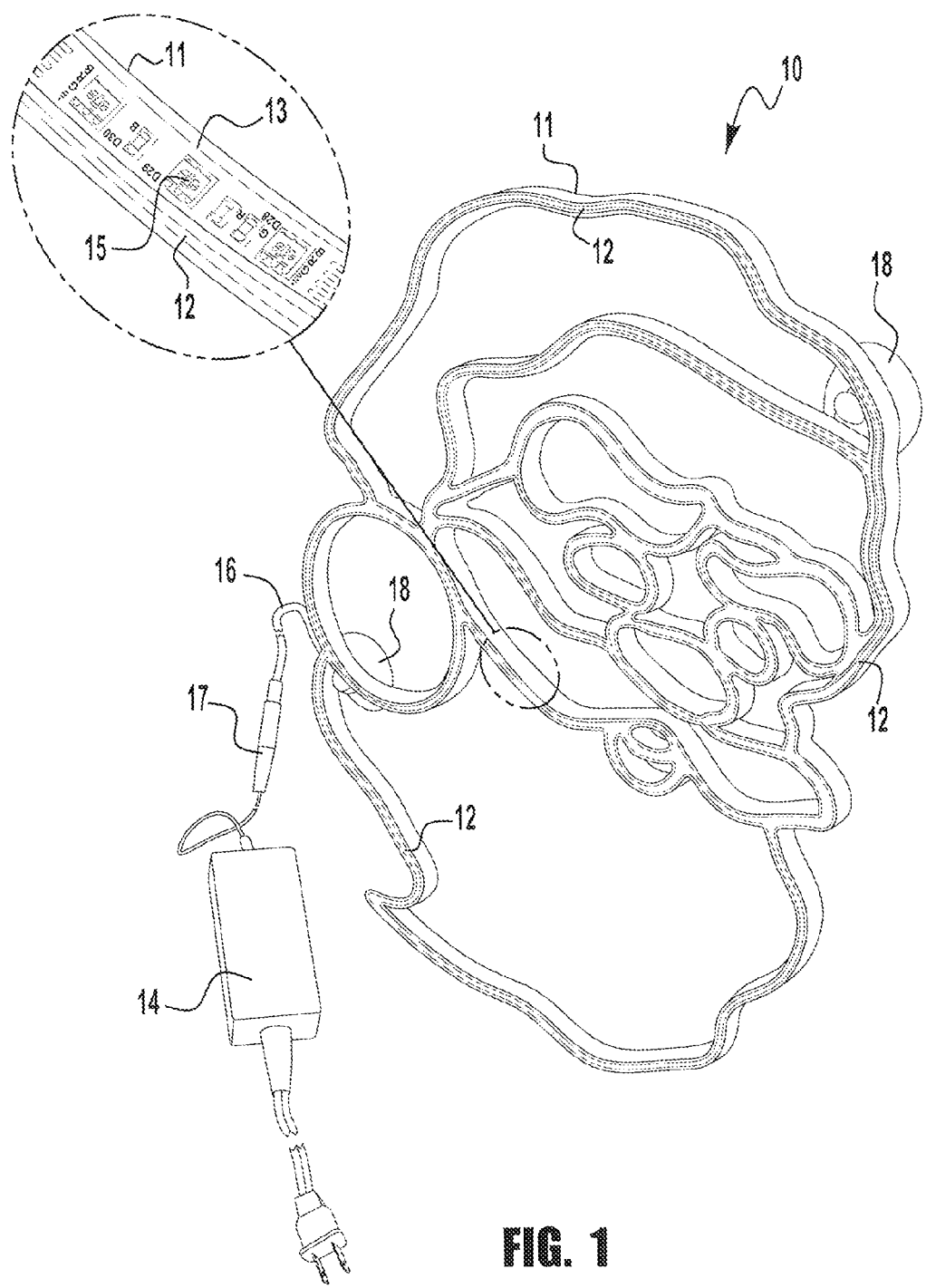
FIG. 1 shows a lighting article exhibiting the shape of Santa Claus which is mountable on a smooth surface such as window glass, according to an embodiment of the present invention.

With reference to FIG. 1, a lighting article such as Santa Claus 10 includes an elongated structure 11 having a groove along the elongation direction. A solid matrix 12 is fitted into the groove. A light-emitting strip 13 is embedded in the solid matrix 12. The light-emitting strip 13 comprises two or more light-emitting diodes 1 mounted on and electrically connected to a flexible circuit board (FCB). Strip 13 is sufficiently flexible such that it can adjust to the shape of Santa Claus 10, i.e., to curved surfaces and corners. A 12V AC/DC adapter 14 supplies electrical power to strip 13 through connector 17 and power cord 10. A through cord power switch may optionally be used in the power supply system. Adapter 14 is connected to a male plug, adapted to mate with a domestic power source having a female electric socket. Vacuum suction cups 18 can be used to mount Santa Claus 10 on a smooth surface such as window glass. Although FIG. 1 shows that diodes 15 are powered with an AC power, it should be understood that they can be powered with battery power supply as well. Although FIG. 1 shows an image of Santa Claus, it should be appreciated that the elongated structure 11 may be configured to resemble any seasonal or other desired images, texts, and numbers, shining or glowing, such as snowflake, reindeer, Easter egg, Christmas tree, pumpkin, star, firecracker, street sign, street number, advertisement display, and commercial logo etc. For example, the lighting articles of the invention may be used in festive decoration, as well as lighting displays e.g. brand name or logotype, for shops, warehouses, and advertising. In an embodiment, the lighting article according to the present invention may be mounted on a wall or window glass to provide the desirable festive decoration. The light illumination from diodes 15 is not only transmitted through the elongated structure 11 to light up Santa Claus 10 but it is also shining on the area around Santa Claus 10 to function as a lamp.

Figure 2:
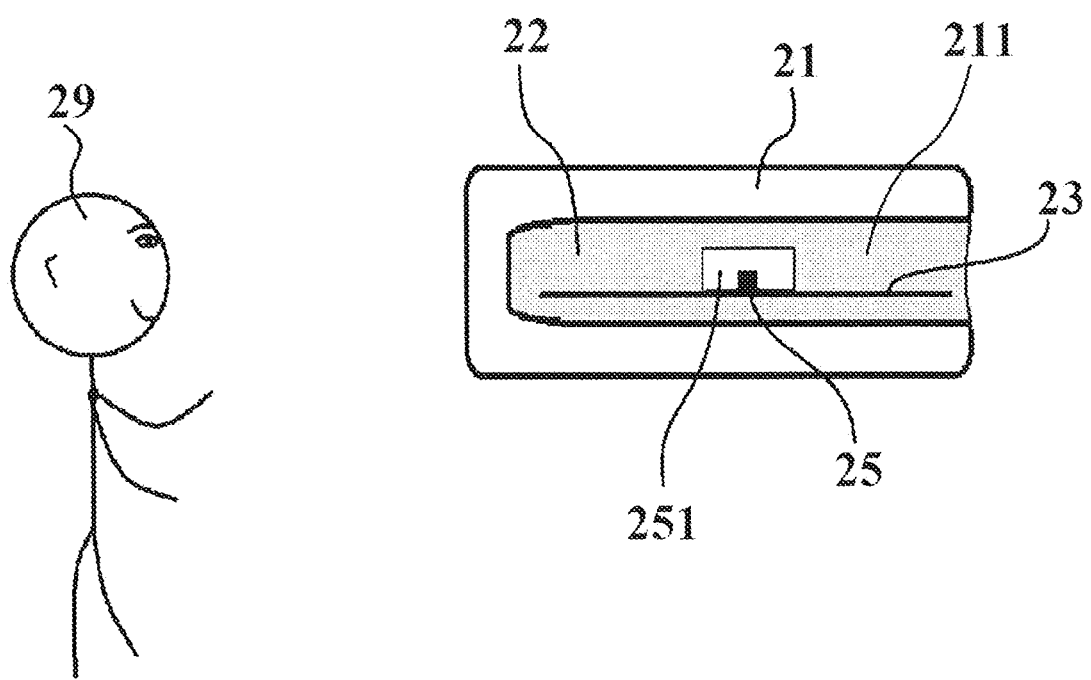
FIG. 2 is a cross-sectional view of the elongated structure of a lighting article, which schematically illustrates the spatial relationship between the elongated structure, the groove thereon, the solid matrix, the strip, and a light-emitting diode in the strip.

With reference to FIG. 2 for more details, an elongated structure 21 having a groove 211 along the elongation direction. A solid matrix 22 is fitted into the groove 211. About 60-98%, preferably 70-98%, and more preferably 80-98% percent of the surface area of the solid matrix 22 is chemically bonded to the elongated structure 21 via the internal surface of the groove 211. A light-emitting strip 23 is embedded in the solid matrix 22. The light-emitting strip 23 comprises two or more light-emitting diodes 25 each of which is encapsulated with an encapsulant 251. The encapsulant 251 covers diodes 25 to prevent them from being affected by moisture or dust in an outer environment, among other purposes. The light refractive indexes of the elongated structure 21, the solid matrix 22 and the encapsulant 251 are R1, R2 and R3 respectively. R2≠R1, and R2≠R3. Optional components such as light-scattering layer and light reflector may also be included in the lighting article of the present invention.

The light-emitting strip 23 may comprise a flexible circuit board (not shown), and the light-emitting diodes 25 are mounted on and electrically connected to the board. As known to a skilled person in the art, many additional components (not shown) may be included in the strip 23 such as lead frame, bond wire, solder, electrode, pad, contact layer, phosphor layer, and dielectric layer etc. For example, a flash control integrated circuit (IC) may be mounted on the flexible circuit board to control the lighting effect of the diodes. An example of suitable light-emitting strip 23 is commercially available from Shenzhen Refond Optoelectronic Co. (Guangdong, China, with Model # RF-W3SA50TS-A40), In various embodiments of the invention, the lighting article may emit light of same color or different colors in either variable or invariable manner. Diodes 25 can be of the same type or of different types, e.g., being of different size or emitting light of different color or intensity. The LED light may also be operated to provide flashing light of a single color or a series of sequential lights of multi-colors so as to accentuate the decorative effect of Santa Claus 10. Each of diodes 25 may also be activated separately to emit sequence of various color lights such that a kaleidoscope of color lights will be displayed.

Most, if not all, light emitted from light-emitting diodes 25 will pass through the encapsulant 251, the solid matrix 22 and the elongated structure 21 in a continuous way. Due to absorption of these materials, the total light output emitted from the lighting article e.g. Santa Claus 10 is less than the total light output emitted directly from all light-emitting diodes 25. In various embodiments of the invention, 70%-99.9%, preferably 80%-99.9%, and more preferably 90%-99.9% of the total light output emitted from the lighting article 10 (not from the diodes 15 or 25) has passed continuously through the encapsulant, the solid matrix and the elongated structure. A small amount of light output emitted from the article 10 may have passed continuously through the encapsulant 251 and the solid matrix 22 only, and bypassed the elongated structure 21, due to the opening ("mouth") of groove 211 is not covered or sealed by any material such as the material for the elongated structure (in other words, the mouth remains open, or is exposed to air). Take a specific example to elucidate this point. All the light-emitting diodes in a lighting article of the invention directly emit a total of, say, 2000 lumens of light. Due to the absorption of the encapsulant, the solid matrix and the elongated structure surrounding the diodes, the light output finally released from the lighting article may be reduced to about 1500 lumens. Because of the geometrical configuration of the lighting article, among the 1500 lumens light, 1400 lumens light has gone through the encapsulant, the solid matrix and the elongated structure one after another; and 100 lumens light has gone through the encapsulant and the solid matrix, bypassing the elongated structure. In this example, we say that 93.3% of the total light output emitted from the lighting article 10 has passed continuously through the encapsulant, the solid matrix and the elongated structure.

As shown in FIG. 2, light-emitting diode 25 may be packaged in a cup-shaped house which is sealed with encapsulant 251. When the viewer 29 observes the lighting article in the horizontal direction, diode 25 is invisible to him or her. Therefore, viewer 29 will see a brighter elongated structure 21, and fewer glaring diode spots. For example, light-emitting strip with Model # RF-W3SA50TS-A40 from Shenzhen Refund Optoelectronic Co. has a viewing angle of 120 degrees. Although in FIG. 2, light-emitting diode 25 irradiates light upward in vertical direction with a viewing angle of say 120 degrees, it should be readily appreciated that, in other parts of the lighting article, diode 25 may irradiate light downward vertically, to the right (horizontally), to the left (horizontally), or any direction there between. In theory, all diodes 25 will be invisible to the viewer 29, if he or she keeps a sufficiently long distance from the lighting article. It should also be appreciated that if viewer 29 is getting closer to the light article, more and more diodes may become visible. In normal operation state of the lighting article, the viewer's perception of glaring LED spots is significantly reduced.

With reference to FIGS. 1 and 2, the light refractive indexes of the elongated structure 11 or 21, the solid matrix 12 or 22 and the encapsulant 251 are R1, R2 and R3 respectively. Making R2≠R1 and R2≠R3 is helpful to create a homogenous light distribution within the elongated structure 21. In preferred embodiments, R1≠R3, for example, R1>R3>R2, exemplary embodiments, R2 is in the range from 1.30-1.49, and R1 and R3 are independently of each other in the range from 1.50 to 1.70. For instance, R2=1.43, R1=1.58, and R3=1.546.

The encapsulant 251, the solid matrix 12 or 22 and the elongated structure 11 or 21 may be independently of each other made of a transparent material. For example, they may independently of each other comprise a material selected from the group consisting of silicone resin, polycarbonate resin, phenol formaldehyde resin, epoxy resin, acrylonitrile butadiene styrene (ABS), polyester resin, polyethylene, polypropylene, polystyrene, acrylic resin, polyethylene terephtalate, polyethylene terenaphtalate, polybutylene terephtalate, polyethersulfone, polyetheretherketone, polyimide, polyetherimide, cellulose triacetate resin, polyacrylate resin, polysulfone resin, a fluoride resin, polyvinyl acetate, alkyd resin, polyurethane resin, vinyl chloride resin, polybutyl methacrylate, polymethyl methacrylate (PMMA), parylene, fluorinated polymer, polyphthalamide (PPA), quartz, glass, silica, alumina, and mixture thereof. Examples of epoxy resin include diglycidylether of bisphenol A; diglycidyl ether of bisphenol 1,4-dimethanol cyelohexyl diglycidyl ether; 1,4-butanediol diglycidyl ether; or any combination thereof.

If desired, the encapsulant 251, the solid matrix 12 or 22 and the elongated structure 11 or 21 may independently of each other comprise a refractive index modifier to tune their refractive indexes into the desired range. Examples of refractive index modifier include, but are not limited to, titanium oxide, hafnium oxide, aluminum oxide, gallium oxide, indium oxide, yttrium oxide, zirconium oxide, cerium oxide, zinc oxide, magnesium oxide, calcium oxide, lead oxide, zinc selenide, zinc sulphide, gallium nitride, silicon nitride, aluminum nitride, or alloys of two or more metals of Groups II, III, IV, V, and VI such as alloys made from Zn, Se, S, and In preferred embodiments, the elongated structure 11 or 21 comprises a material selected from the group consisting of polycarbonate resin, acrylonitrile butadiene styrene (ABS), polymethylmethacrylate (PMMA), acrylic resin, polyester resin, a silicone resin, polypropylene resin, glass, silica, and alumina. The encapsulant 251 comprises a material selected from the group consisting of silicone resin, epoxy resin, glass resin, acrylics, and polyimides. The solid matrix 12 or 22 comprises phenol formaldehyde resin, or epoxy resin.

The light-emitting diodes 15 or 25 in FIGS. 1 and 2 may comprise a semiconductor material selected from GaAs, GaP, GaAlAs, GaAsP, AlGaInP, GaN, InN, AlN, InGaN, InGaAlN, ZnSe, BAlGaN, BN, and SiC, In an exemplary embodiment, the materials of the LED dice are InGaN, InGaP and AlGaInP. For example, a light-emitting strip having LED dice made of InGaN, InGaP and AlGaInP may be commercially obtained from Shenzhen Refond Optoelectronic Co. (Guangdong, China, with Model # RF-W3SA50TS-A40).

To optimize the color profile of the emitted light, a phosphor layer may be applied on the surface of the light-emitting diodes 15 or 25. Alternatively, the encapsulant 251, the solid matrix 12 or 22 and the elongated structure 11 or 21 may be independently of each other doped with phosphor particles. As known to a skilled artisan, a phosphor can absorb light e.g. omitted from diodes 15 or 25 and convert it into a light with different wavelength.

Suitable phosphors may be those made of a material selected from a group consisting of garnets, sulfides, silicates, nitrides and mixtures thereof. For example, garnets comprise cerium-doped yittrium aluminum oxide $Y_3Al_5O_{12}$ garnet ("YAG:Ce"); $(Y_{1-x-y}Gd_xCe_y)_3Al_5O_{12}$ ("YAG:Gd, Ce"); $(Y_{1-x}Ce_x)_3(Al_{5-y}Ga_y)O_{12}$ ("YAG:Ga,Ce"); $(Y_{1-x-y}Gd_xCe_y)(Al_{5-z}Ga_z)O_{12}$ ("YAG:Gd,Ga,Ce"); or any combination thereof, wherein $0 \le x \le 1$, $0 \le y \le 1$, $0 \le z \le 5$, and $x+y \le 1$.

Phosphor may be a blue light-emitting phosphor, a blue-green light-emitting phosphor, a green light-emitting phosphor, a yellow-orange light-emitting phosphor, a red light-emitting phosphor, or any combination thereof.

Blue light-emitting phosphor may be selected from $BaMg_2Al_{16}O_{27}:Eu^{2+}$; $Sr_5(PO_4)_{10}Cl_2:Eu^{2+}$; $(Ba,Ca,Sr)(PO_4)_{10}(Cl,F)_2:Eu^{2+}$; $(Ca,Ba,Sr)(Al,Ga)_2S_4:Eu^{2+}$; $(Ba,Sr,Ca)_5(PO_4)_3(Cl,F,Br,OH):Eu^{2+},Mn^{2+},Sb^{3+}$; $(Ba,Sr,Ca)MgAl_{10}O_{17}:Eu^{2+},Mn^{2+}$; $(Ba,Sr,Ca)BPO_5:Eu^{2+},Mn^{2+}$; $(Sr,Ca)_{10}(PO_4)_6*nB_2O_3:Eu^{2+}$; $2SrO*0.84P_2O_5*0.16B_2O_{3:Eu^{2+}}$; $Sr_2Si_3O_8*2SrCl_2:Eu^{2+}$; $Ba_3MgSi_2O_8:Eu^{2+}$; $Sr_4Al_{14}O_{25}:Eu^{2+}$ (SAE); $BaAl_8O_{13}:Eu^{2+}$; or any combination thereof. Blue-green light-emitting phosphor may be selected from $Sr_4Al_{14}O_{25}:Eu^{2+}$; $BaAl_8O_{13}:Eu^{2+}$;

$2SrO*0.84P_2O_5*0.16B_2O_3:Eu^{2+}$; $(Ba,Sr,Ca)MgAl_{10}O_{17}$: $Eu^{2+},Mn^{2+}$; $(Ba,Sr,Ca)_5(PO_4)_3(Cl,F,OH):Eu^{2+},Mn^{2+},Sb^{3+}$; or any combination thereof.

Green light-emitting phosphor may be selected from $Ca_8Mg(SiO_4)_4Cl_2:Eu^{2+},Mn^{2+}$; $GdBO_3:Ce^{3+},Tb^{3+}$; $CeMgAl_{11}O_{19}:Tb^{3+}$; $Y_2SiO_5:Ce^{3+},Tb^{3+}$; $BaMg_2Al_{27}:Eu^{2+}$, $Mn^{2+}$; $(Ba,Sr,Ca)MgAl_{10}O_{17}:Eu^{2+},Mn^{2+}$ (BAMn); $(Ba,Sr,Ca)Al_2O_4:Eu^{2+}$; $(Y,Gd,Lu,Sc,La)BO_3:Ce^{3+},Tb^{3+}$; $Ca_8Mg(SiO_4)_4Cl_2:Eu^{2+},Mn^{2+}$; $(Ba,Sr,Ca)_2SiO_4:Eu^{2+}$; $(Ba,Sr,Ca)_2(Mg,Zn)SiO_7:Eu^{2+}$; $(Sr,Ca,Ba)(Al,Ga,In)_2S_4:Eu^{2+}$; $(Y,Gd,Tb,La,Sm,Pr,Lu)_3(Al,Ga)_5O_{12}:Ce^{3+}$; $(Ca,Sr)_8(Mg,Zn)(SiO_4)_4Cl_2:Eu^{2+}$ (CASI); $Na_2Gd_2B_2O_7:Ce^{3+}$; $(Ba,Sr)_2(Ca,Mg,Zn)B_2O_6:K,Ce,Tb$; or any combination thereof.

Yellow-orange light-emitting phosphors may be selected from $(Ba,Ca,Sr)(PO_4)_{10}(Cl,F)_2:Eu^{2+},Mn^{2+}$; $(Sr,Ca,Ba,Mg,Zn)_2P_2O_7:Eu^{2+},Mn^{2+}$ (SPP); $(Ca,Sr,Ba,Mg)_{10}(PO_4)_6(F,Cl,Br,OH):Eu^{2+},Mn^{2+}$ (HALO—); $((Y,Lu,Gd,Tb)_{1-x}Se_xCe_y)_2(Ca,Mg)_{1-r}(Mg,Zn)_{2+r}Si_{z-q}Ge_qO_{12+\delta}$; or any combination thereof.

Red light-emitting phosphor may be selected from $Y_2O_3$: $Bi^{3+},Eu^{3+}$; $Sr_2P_2O_7:Eu^{2+},Mn^{3+}$; $SrMgP_2O_7:Eu^{2+},Mn^{2+}$; $(Y,Gd)(V,B)O_4:Eu^{3+}$; $3.5.MgO*0.5MgF_2*GeO_2:Mn^{4+}$ (MFG, magnesium fluorogermanate); $(Gd,Y,Lu,La)_2O_3$: $Eu^{3+},Bi^{3+}$; $(Gd,Y,Lu,La)_2O_2S:Eu^{3+}$, $Bi^{3+}$;$(Gd,Y,Lu,La)VO_4:Eu^{3+},Bi^{3+}$; $(Ca,Sr)S:Eu^{2+},Ce^{3+}$; $SrY_2S_4:Eu^{2+},Ce^{3+}$; $CaLa_2S_4:Ce^{3+}$; $(Ca,Sr)S:Eu^{2+}$; $(Ba,Sr,Ca)MgP_2O_7:Eu^{2+}$, $Mn^{2+}$; $(Y,Lu)_2WO_6:Eu^{3+},Mo^{6+}$; $(Ba,Sr,Ca)_xSi_yN_z:Eu^{2+}$, $Ce^{3+}$; $(Ba,Sr,Ca,Mg)_3(Zn,Mg)Si_2O_8:Eu^{2+},Mn^{2+}$; or any combination thereof.

Figure 3:
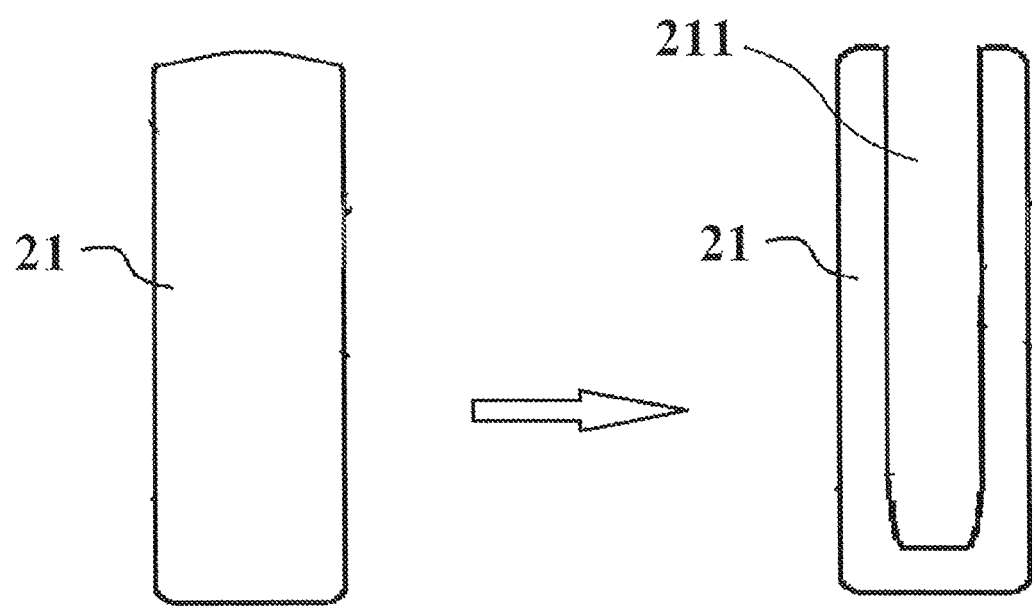
FIG. 3 illustrates a step of providing an elongated structure having a groove along the elongation direction according to an embodiment of the present invention.
Figure 4:
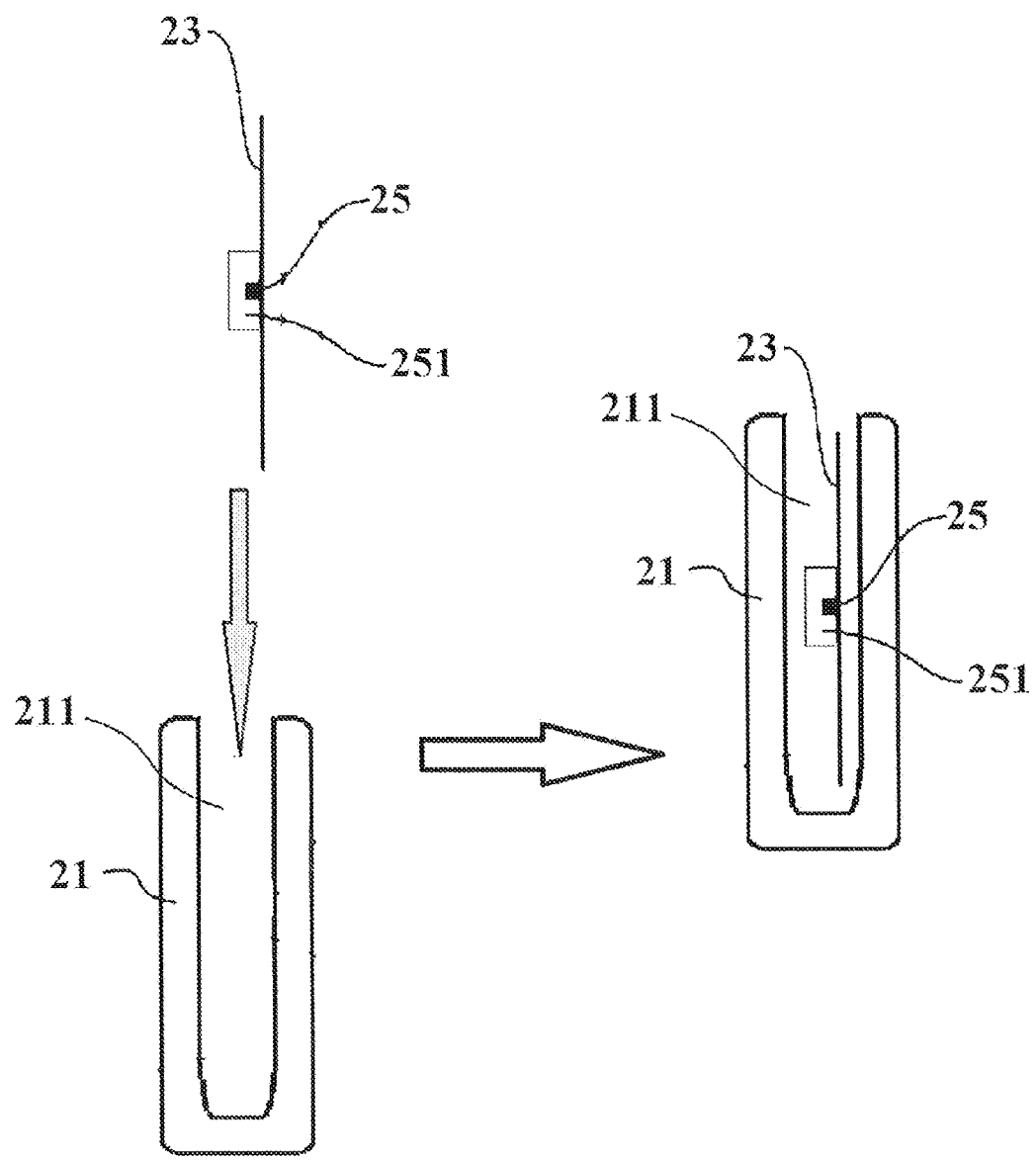
FIG. 4 shows a step of placing a light-emitting strip comprising encapsulated LEDs into the groove of FIG. 3 according to an embodiment of the present invention.
Figure 5:
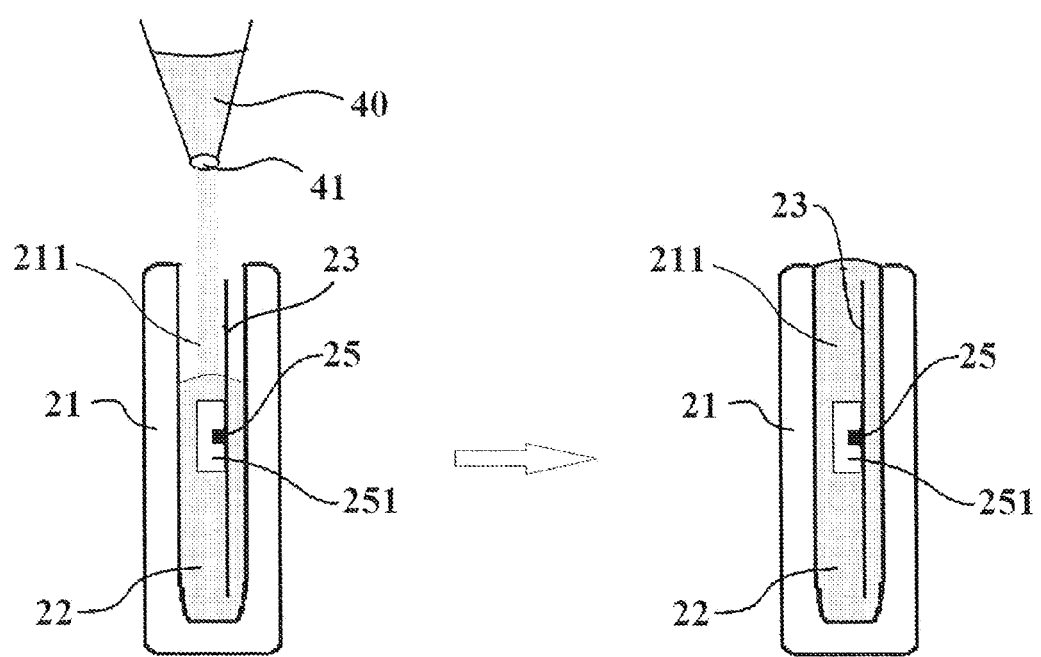
FIG. 5 illustrates a step of filling the groove with a liquid material so that the light-emitting strip therein is immersed in the liquid material according to an embodiment of the present invention.
Figure 6:
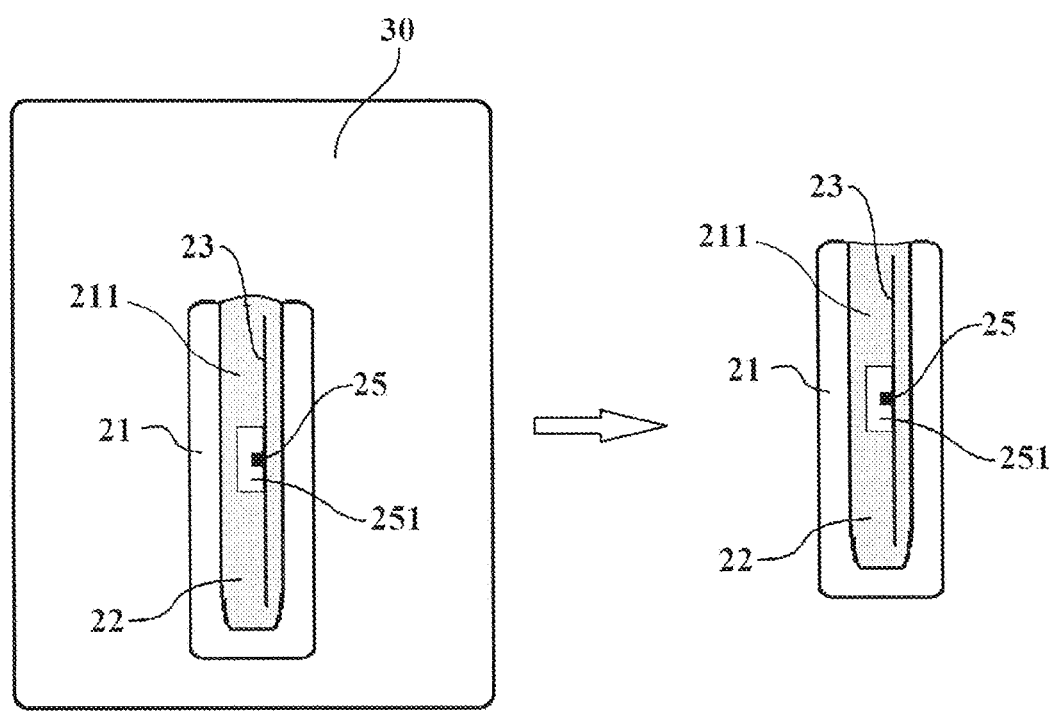
FIG. 6 illustrates a step of solidifying the liquid material into a solid matrix so that the light-emitting strip is embedded in the solid matrix according to an embodiment of the present invention.

The present invention can provide a simple process for preparing the lighting article as described above (e.g. a flexible or soft LED strip lamp). The flexible LED strip and the elongated structure that carries the strip are integrated into a single unit, and function together as a whole. to achieve improved lighting effects. such as better perception of decoration. In various embodiments of the invention, the lighting article as shown in FIG. 2 can be manufactured by a process as shown. In FIGS. 3-6, which comprises the following steps:

(i) as shown in FIG. 3, providing an elongated structure 21 having a groove 211 along the elongation direction;

(ii) as shown in FIG. 4, placing a light-emitting strip 23 inside the groove 211, wherein the light-emitting strip 23 comprises two or more light-emitting diodes 25 each of which is encapsulated with an encapsulant 251;

(iii) as shown in FIG. 5, filling the groove 211 with a liquid material 22 so that light-emitting strip 23 is immersed in the liquid material 22; and (iv) as shown in FIG. 6, solidifying the liquid material 22 into a solid matrix 22 so that the light-emitting strip 23 is embedded. In said solid matrix 23, and the solid matrix 23 is fitted into the groove 211 with 60-98% percent of its surface area being chemically bonded to the elongated structure 21.

In preferred embodiments of the process, the light refractive indexes of the elongated. structure 21, the solid matrix 22 and the encapsulant 251 are R1, R2 and R3 respectively, R2≠R1 and R2≠R3, as described above. The elongated structure may comprise polycarbonate, the solid matrix comprises epoxy resin or phenol formaldehyde resin, and the encapsulant comprises silicon.

An exemplary embodiment of the process is described as the following:

In step (i) as shown in FIG. 3, the elongated structure (hereinafter interchangeable with "carrier") 21 may be made by injection molding using suitable plastic raw materials as described above. For example, Tarflon® Grade IR2200 polycabonate may be commercially obtained from Formosa Idemitsu Petrochemical Corp. (Taipei, Taiwan), and used to make the elongated structure 21. The elongated structure 21 may be configured to resemble a desirable shape such as Santa Claus 10. A continuous groove 211 may be formed (e.g. by cutting) along the elongation direction. At least one sidewall, preferably all the sidewalls, of the groove 211 is transparent. The depth of the groove 211 is larger than the width of the LED strip 23 as shown in FIG. 4. For example, the thickness of the sidewall of the groove 211 may range from 0.5 mm to 5 mm and the width of the groove 211 may range from 5 mm to 10 mm.

In step (ii) as shown in FIG. 4, the LED strip 23 is put into the groove, and the light-emitting side of the LED strip 23 faces a transparent side of the groove 211. General techniques for sealing diodes 25 with encapsulant 251 may be employed in the present invention, such as casting, resin transfer molding and the like. After diodes 25 are enveloped in the uncured formulation, typically performed in a mold, the formulation is cured to form encapsulant 251. The curing may he conducted in one or more stages using methods such as thermal, UV, electron beam techniques, or combinations thereof. For example, the formulations may be cured in two stages wherein an initial thermal or UV cure, for example, may be used to produce a partially hardened resin. This material which is easily handled, may then be further cured using, for example, either thermal or UV techniques, to produce a material with the desired thermal performance (for example glass transition temperature (Tg) and coefficient of thermal expansion (CTE)), optical properties and moisture resistance etc. required for encapsulated diodes 25.

In step (iii) as Shown in FIG. 5, the groove 211 is filled with a suitable two-part liquid material 22, and the light-emitting strip 23 is immersed in the liquid material 22. For example, a soft resin may be prepared from a two-part liquid composition that is commercially available from Boluo Qiangli Multiple Material Co. (Boluo, Guangdong, China), as directed by the product specification. In the two-part liquid composition from Boluo, the model number for the primary agent (or commonly known as glue) is 560A-5831, and the model number for the solidifying agent is 560B-5831. In an embodiment, the groove 211 is filled with a mixture of glue 560A-5831 and solidifying agent 560B-5831 to the extent that the LED strip 23 is completely submerged. The mass ratio of the glue 560A-5831 and the solidifying agent 560B-5831 may be in the range of from 1:1 to 5:1.

In a specific embodiment, mixing the glue 560A-5831 and the solidifying agent 560B-5831 includes: 1) the glue and the solidifying agent are prepared and weighed in accordance with desirable ratio; 2) the glue and the solidifying agent, before mixing them together, are continuously subject to a vacuum at a pressure of 0.1 Pa and the process is repeated for 4-8 times, with each time lasting about 60 seconds; 3) the glue and solidifying agent are mixed and stirred in the same direction around a fixed axis for 200~300 s with a rotation speed of 120 rpm. In the same time, the mixture is continuously subject to a vacuum at a pressure of 0.1 Pa and the process is repeated 2~4 times, each time lasting 60~100 s. An even mixture of glue and solidifying agent is thus obtained. Within about 30 minutes, the mixture is injected or poured into the groove. The caliber of the pouring mouth (nozzle) 41 of the injection device 40 is 2-5 mm and the pouring rate is about 5-10 g/s.

When the glue and the solidifying agent are separately subject to vacuum as described above, air content in the glue and solidifying agent may be reduced. Formation of air bubbles can therefore be reduced when the glue and solidifying agent are being mixed later. After the blending step starts, the mixture of the glue and the solidifying agent is again subject to vacuum as described above. Such a treatment of the mixture helps reducing the amount of air that is carried into the liquid mixture during, mixing, and/or air that is remained (e.g. residual air content) in the glue and solidifying agent after the first vacuum treatment. The multiple vacuum treatments can ensure that bubbles in the mixture are reduced to the minimal level, and the LED strip and the carrier can therefore appear as a homogeneous and integrated "whole" body.

As described above, the injection operation is carried out within 30 min after the mixing of the glue and the solidifying agent is completed. A good timing of the injection can prevent the mixture from getting too dense (or "sticky") over time to allow speedy operation in the subsequent procedures. Furthermore, as shown in FIG. 5, the caliber of the pouring mouth 41 of the injection device 40 is maintained at 2~5 mm, and the injection rate is maintained at 5~10 g/s. These parameters are preferred because a smaller caliber may slow down the material's injection rate (or output), and a bigger caliber and higher injection rate may undesirably generate air bubbles at the injection nozzle 41.

The thickness of the sidewall of the groove 211 is preferably 0.5~5 mm. While a thinner sidewall may suffer from weak strength and fracture or breakage in later steps, a thicker sidewall may absorb some light, and lower the brightness of the LED strip lamp. The width of the groove 211 is preferably 5~10 mm, which can not only avoid bubble formation that is frequently occurred with narrower widths, but also reduce the waste of raw material and unnecessary absorption of light.

It should be appreciated that the solid matrix 22 may be made from any suitable thermoset resin formulations, e.g. two-part liquid composition, that are known to a skilled person in the art. Formulating curable compositions with certain components in each of two parts has been necessary in some instances, for example to provide desirable storage stability. Sometimes, the two parts of the compositions need to be mixed in different ratios for different applications. A first part of the two-part compositions may include the polymerizable monomer/oligomer, while the second includes curing agents such as polymerization initiator. Other components if present, such as stabilizers, accelerators etc. are assigned to either the first or second part as appropriate and as will be apparent to the person skilled in the art. Due to the necessity to mix the components of two-part curable compositions each component is usually a liquid. Typically the two-parts of the composition are held in separate chambers of a packaging. The packaging may have a mechanism to dispense the components which also mixes the components in the desired ratio on dispensing. Such packaging is well known and includes for example dispensing syringes and the like. For ease of reference, a first part of the composition (usually the part containing the polymerizable monomer or oligomer) may be referred to as "part A" while the second part, normally containing the cure system may be referred to as "part B".

For example, when epoxy resin is used to make the solid matrix 22, the first part of the two-part composition may comprise 1-chloro-2,3-epoxypropane (epichlorohydrin) and the second part of the two-part composition may comprise a co-reactant having poly functional groups. The co-reactant may comprise two or more groups independently of each other selected from amine, acid, acid anhydride, phenol, alcohols, thiol, and any combination thereof. Examples of the co-reactant include, but are not limited to, p-amino phenol, glyoxal tetraphenol, bisphenol compounds such as 2,2-bis(4-hydroxyphenyl)propane (bisphenol A) and bis(hydroxyphenyl)methane (bisphenol F), and any mixture thereof. For example, bisphenol-A diglycidyl ether epoxy resin may be made from solidifying a liquid mixture of epichlorohydrin and bisphenol A.

Condensation polymers such as phenol-aldehyde resins may also be used to make the solid matrix 22. Any phenol-aldehyde resin that can be prepared from a phenol compound and an aldehyde under either an acid condition or a basic condition can be used herein. In some embodiments, the phenol compound has formula (I):

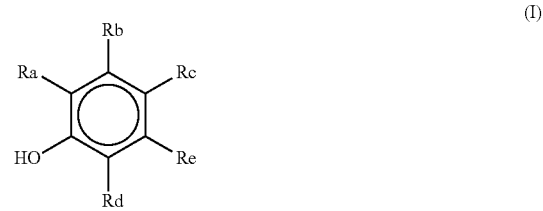

wherein each of Ra, Rb, Rc, Rd and Re of the phenol compound of formula (I) is independently hydrogen; hydroxy; halide such as fluoride, chloride, bromide and iodide; nitro; benzo; carboxy; alkoxycarbonyl; acyl such as formyl, alkylcarbonyl (e.g. acetyl) and arylcabonyl benzoyl); alkyl such as methyl, ethyl, propyl, butyl, pentyl, hexyl, heptyl, octyl, nonyl, decyl, and the like; aryl such as phenyl and naphthyl; aralkyl such as benzyl; or alkaryl such as alkylphenyls. In certain embodiments, each of Ra, Rb, Rd and Re of the phenol compound of formula (I) is independently H; and Re is alkyl. In other embodiment, each of Ra, Rb, Re, Rd and Re of the phenol compound of formula (I) is H.

In certain embodiments, the phenol compound has formula (II):

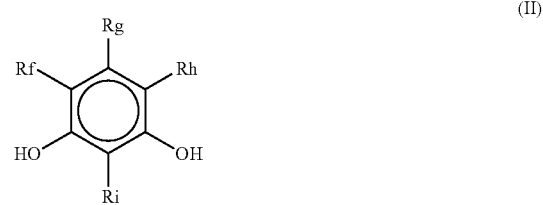

wherein each of Rf, Rg, Rh and Ri is independently hydrogen; hydroxy; halide such as fluoride, chloride, bromide and iodide; nitro; benzo; carboxy; acyl such as formyl, alkylcarbonyl (e.g. acetyl) and arylcarbonyl (e.g., benzoyl); alkyl such as methyl, ethyl, propyl, butyl, pentyl, hexyl, heptyl, octyl, nonyl, decyl, and the like; alkenyl such as unsubstituted or substituted vinyl and allyl; unsubstituted or substituted methacrylate; unsubstituted or substituted acrylate; silyl ether; siloxanyl; aryl such as phenyl and naphthyl; aralkyl such as benzyl; or alkaryl such as alkylphenyls. In some embodiments, each of Rf, Rg, Rh and Ri of the phenol compound of formula (II) is H. In other embodiments, each of Rf, Rh and Ri of the phenol compound of formula (II) is H; and Rg is alkyl.

Examples of the phenol include phenol and an alkylphenol such as m-cresol, p-tort-butylphenol, o-propylphenol, resorcinol, or bisphenol A.

Any aldehyde that reacts with the phenol compounds disclosed herein can be used to prepare the phenol-aldehyde resin. In some embodiments, the aldehyde is represented by formula (III):

$$Rj\text{-}CH=O \qquad (III)$$

wherein Rj is H, alkyl, substituted alkyl such as aralkyl, aryl, or substituted aryl such as alkaryl. In certain embodiments, Rj is alkyl. In other embodiments, Rj is $C_{1-22}$ alkyl such as methyl, ethyl, propyl, isopropyl, butyl, isobutyl, pentyl, isopentyl, hexyl, octyl, nonyl, decyl, dodecyl, tetradecyl, hexadecyl, octadecyl, benzyl and the like. In some embodiments, Rj is a $C_{3-22}$ alkyl group. In certain embodiments, Rj is a $C_3$ alkyl group. In other embodiments, Rj is H, i.e., the aldehyde is formaldehyde. The term "formaldehyde" also encompasses any substance that can split off or release formaldehyde, such as paraformaldehyde and trioxane.

In some embodiments, the aldehyde is an alkyl aldehyde such as n-butyraldehyde, isobutyraldehyde, valeraldehyde, lauryl aldehyde, palmityl aldehyde, stearyl aldehyde or a combination thereof. In further embodiments, the aldehyde is formaldehyde, an alkyl aldehyde or a combination thereof. When a mixture of aldehydes is used, they can be added to the reaction mixture individually, simultaneously or sequentially.

The phenol-aldehyde resin used for solid matrix 22 can be prepared by two different methods. The first method utilizes a stoichiometric excess of the phenolic compound (e.g., phenol or resorcinol) over the aldehyde (e.g., formaldehyde) in the presence of an acidic catalyst to form a phenolic novolac or novolak. The novolak generally requires the addition of a methylene donor such as formaldehyde, paraformaldehyde or hexamethylenetetramine (HEXA) to effect curing. The other method utilizes a stoichiometric excess of the aldehyde (e.g., formaldehyde) over the phenolic compound (e.g., phenol or resorcinol) in the presence of a base catalyst to form a phenolic resole. The phenolic resole can be subsequently cured to a thermosetting polymer simply by heating or the addition of an acid catalyst.

In step (iv) as shown in FIG. 6, the carrier 21 which has been filled with glue and solidifying agent (i.e. the liquid material 22) is placed in a solidifying chamber 30 for solidification. The humidity degree of the solidifying chamber 30 is 75%~85%, and the temperature of the solidifying chamber 30 is at least 15° C. When the temperature of the solidifying chamber 30 is 15~19° C., the solidifying time is 14~15 hours. When the temperature of the solidifying chamber 30 is 20~29° C., the solidifying time is 10~12 hours. When the temperature of the solidifying chamber 30 is 30° C. or above. the solidifying time is 8~10 hours. Subsequently, the finished product is removed from the solidifying chamber 30 after the solidification is completed.

If necessary, step (iv) may further include an additional or supplemental step to "remedy" any defects of the mixture of glue and solidifying agent. Such a remedial operation for the glue and solidifying agent mixture is performed during the solidification. For example, the remedial operation is performed within 10~18 min after the solidification begins. The timing of the remedial operation may be important, because the operation, if too late (e.g. after complete solidification is achieved), may form faulty layers in the solid matrix. Therefore, earlier remedial operation can improve the integrity and aesthetic appeal of the LED strip Santa lamp.

Compared to existing technologies, the present invention is advantageous in that a carrier having the shape of a relevant object (e.g. Santa Claus) is first formed by injection molding using a plastic raw material. The carrier has an outer frame which resembles the outline of the object. Then a continuous groove is formed in the outer frame along the object's outline. After placing the flexible LED strip into the groove, the groove is sealed with a filling mixture of glue and solidifying agent. After solidification of the mixture, a LED strip lamp (for decoration or for illumination) comprising the carrier and the LED strip is manufactured. Automated production of such LED strip lamps can be achieved using the process as described above. The process is simple and easy to be implemented. Furthermore, when the LED strip lights up, the carrier's outline can be vividly presented by lights spreading and reflecting outside and inside the carrier. As the carrier works along with the LED strip as a whole in fulfilling the ornamental function, the ornamental effect is significantly improved.

Example 1

Glowing Santa Claus

A light-emitting strip was purchased from Shenzhen Refond Optoelectronic Co. (Guangdong, China, with Model # RE-W3SA50TS-A40). A transparent carrier with a designed shape of Santa Claus (similar to FIG. 1) was formed by injection molding method using Tarflon® Grade IR2200 polycarbonate. The carrier was molded into one piece through injection molding. A continuous groove was formed in the outer frame of the carrier along the elongation direction. The thickness of the sidewall of the groove was 0.5 mm and the width of the groove was 5 mm. The depth of the groove was larger than the width of the strip. The strip was placed into the groove.

A two-part liquid composition was purchased from Boluo Qiangli Multiple Material Co. (Boluo, Guangdong, China). The composition includes a primary agent 560A-5831 (or "glue") and a solidifying agent 560B-5831. The mass ratio between the glue and the solidifying agent was about 5:1. The glue and the solidifying agent were separately weighed in accordance with the ratio. The glue and the solidifying agent were continuously treated with a vacuum at a pressure of 0.1 Pa and the process was repeated 4-8 times. with each time lasting 60 seconds. The glue and the solidifying agent were then blended and stirred in the same direction around a fixed axis for 200~300 s, the rotation speed being 120 r/m. The mixture was also continuously treated with a vacuum under a pressure of 0.1 Pa and the process was repeated 2~4 times, each time lasting 60~100 s. The mixture of glue and solidifying agent was thus obtained.

The groove was then injection filled with the liquid mixture of the glue and the solidifying agent to the extent that the strip was completely submerged or immersed in the liquid mixture. The injection was performed within 30 min after the mixture of glue and solidifying agent was obtained. The caliber of the pouring mouth of the injection apparatus was 2 mm and the pouring speed was 5 g/s.

The carrier that has been tilled with the glue and solidifying agent was placed in a solidifying chamber for solidification. The :humidity degree of the solidifying chamber was 75%~85%. The temperature of the solidifying chamber was at least 15° C.; When the temperature of the solidifying chamber was 15~19° C., the solidifying time was 14~15 hours. When the temperature in the solidifying chamber was 20~29° C., the solidifying time was 10~12 hours. When the temperature of the solidifying chamber was 30° C. or above, the solidifying time was 8~10 hours.

A remedial operation for the glue and solidifying agent mixture may be performed during the solidification. Preferably, the remedial operation was performed within 10~18 min after the solidification began.

The carrier was then removed from the solidifying chamber after the solidification was completed.

In this example, the plastic raw material was a colorless transparent plastic material. Color master batch may be added into the plastic raw material to ensure that the plastic raw material is colorless and transparent so that at least one side of the groove wall is transparent.

Example 2

A light-emitting-strip was purchased from Shenzhen Refond Optoelectronic Co. (Guangdong, China, with Model # RF-W3SA50TS-A40). A transparent carrier with a designed shape of Santa Claus (similar to FIG. 1) was formed by injection molding method using Tarflon® Grade IR2200 polycarbonate. The carrier was molded into one piece through injection molding. A continuous groove was formed in the outer frame of the carrier along the elongation direction. At least one side of the wall of the groove was transparent. The thickness of the sidewall of the groove was 0.5 mm and the width of the groove was 5 mm. The depth of the groove was larger than the width of the strip. The strip was placed into the groove. The light-emitting side of the LED strip faced the transparent side of the groove.

A two-part liquid composition was purchased from Boluo Qiangli Multiple Material Co. (Boluo, Guangdong, China). The composition includes a primary agent 560A-5831 (or "glue") and a solidifying agent 560B-5831. The mass ratio between the glue and the solidifying agent was about 1:1. The glue and the solidifying agent were separately weighed in accordance with the ratio. The glue and the solidifying agent were continuously treated with a vacuum at a pressure of 0.1 Pa and the process was repeated 4-8 times, with each time lasting 60 seconds. The glue and the solidifying agent were then blended and stirred in the same direction around a fixed axis for 200~300 s, the rotation speed being 120 r/m. The mixture was also continuously treated with a vacuum under a pressure of 0.1 Pa and the process was repeated 2~4 times, each time lasting 60~100 s. The mixture of glue and solidifying agent was thus obtained.

The groove was then injection filled with the liquid mixture of the glue and the solidifying agent to the extent that the strip was completely submerged or immersed in the liquid mixture. The injection was performed within 30 min after the mixture of glue and solidifying agent was obtained. The caliber of the pouring mouth of the injection apparatus was 2 mm and the pouring speed was 10 g/s.

The carrier that has been filled with the glue and solidifying agent was placed in a solidifying chamber for solidification. The humidity degree of the solidifying chamber was 75%~85%. The temperature of the solidifying chamber was at least 15° C.; When the temperature of the solidifying chamber was 15~19° C., the solidifying time was 14~15 hours. When the temperature in the solidifying chamber was 20~29° C., the solidifying time was 10~12 hours. When the temperature of the solidifying chamber was 30° C. or above, the solidifying time was 8~10 hours.

A remedial operation for the glue and solidifying agent mixture may be performed during the solidification. Preferably, the remedial operation was performed within 10~18 min after the solidification began.

The carrier was then removed from the solidifying chamber after the solidification was completed.

Example 3

Based on Examples 1 and 2, a remedial operation for the mixture of the glue and the solidifying agent was included in this Example. The operation was completed within 10-18 min after solidification began.

In various embodiments of the invention, the plastic raw material for the carrier can be selected from acrylonitrile butadiene styrene (ABS), polymethylmethacrylate (PMMA), polycarbonate (PC), polypropylene (PP), etc. The groove may be U shaped. As the place for accommodating the flexible LED strip, the groove preferably has at least one transparent side wall, which ensures that the light emitted from the LED strips can pass through. The formulation ratio range of the glue and the solidifying agent is generally in the range of 1:1 to 5:1, so as to obtain a highly transparent mixture and to ensure good light transmission.

The caliber of the pouring mouth of the injection device may be 2-5 mm and the injection rate was 5-10 g/s, which is determined by the density of the glue and solidifying agent mixture, and the feasibility and convenience associated with the subsequent procedures.

The present invention thus provides a method of preparing soft LED strip lamps. First, a carrier with a desirable shape of a desirable object is formed by injection molding method using a plastic raw material. The carrier includes an outer frame which forms the outline of the object. Then a continuous groove is formed in the outer frame along the outline of the desirable object, and a flexible LED strip is put into the groove. A mixture of glue and solidifying agent is filled into the groove to the extent that the strip is completely submerged. Finally, a LED lamp comprising a flexible LED strip and a carrier is obtained after solidification of the mixture of the glue and the solidifying agent. One advantage of the invention is that the procedure is simple and can be automated. Another advantage of the invention is that, when the flexible LED strip lights up, the carrier's outline can be vividly presented with lights spreading and reflecting outside and inside the carrier. Stilt another advantage of the invention is that the carrier works together with the LED strip as a whole in fulfilling the ornamental function, and the ornamental effect is therefore improved.

The present invention provides a few representative embodiments as specified in the following:

Embodiment 1: A process for preparing a flexible LED strip lamp, which is characterized in having the following steps: (1) according to design requirements, a carrier with a desirable shape of a desirable object is formed by injection molding method using a plastic raw material, wherein said carrier includes an outer frame which forms the outline of the object; and said frame is molded into one piece through injection molding; (2) a continuous groove is formed in the outer frame along the outline of the desirable object, wherein at least one side of the wall of said groove is transparent; and the depth of said groove is larger than the width of the soft LED strip; (3) the LED strip is put into the groove, wherein the light-emitting side of the soft LED strip faces the transparent side of the groove; (4) the groove is filled with a mixture of glue and solidifying agent to the extent that the LED strip is completely submerged, wherein the mass ratio of glue and solidifying agent is 1:1-5:1; (5) the carrier which has been filled with glue and solidifying agent is placed in a solidifying chamber for solidification, wherein the humidity degree of said solidifying chamber is 75%~85%; the temperature of said solidifying chamber is at least 15° C.; when the temperature of the solidifying chamber is 15~19° C., the solidifying time is 14~15 hours; when the temperature of the solidifying chamber is 20~29° C., the solidifying time is 10~12 hours; and when the temperature of the solidifying chamber is 30° C., or above, the solidifying time is 8~10 hours; (6) the carrier is removed from the solidifying chamber after the solidification, and a LED strip lamp having a flexible LED strip and a carrier is obtained.

Embodiment 2: The process according to Embodiment 1, which is characterized in that a remedial operation for the glue and solidifying agent mixture is conducted during solidification in step (5), wherein the remedial operation should be completed within 10-18 min after solidification begins.

Embodiment 3: The process according to Embodiment 1, which is characterized in that said mixture of glue and solidifying agent in step (4) is prepared as follows: (4-1) the glue and the solidifying agent are prepared in accordance with desirable ratio; (4-2) the glue and the solidifying agent are continuously vacuumized at a pressure of 0.1 Pa and the process is repeated 4-8 times, with each time lasting 60 s; (4-3) the glue and solidifying agent are mixed. and stirred in the same direction around a fixed axle for 200~300 s, the rotation speed being 120 r/m; and (4-4) the mixture in step 4-3) is continuously vacuumized under a pressure of 0.1 Pa and the process is repeated 2~4 times. each time lasting 60~100 s. The mixture of glue and solidifying agent is thus obtained.

Embodiment 4: The process according to Embodiment 3, which is characterized in that an injection procedure in said step (4) is performed within 30 min after the mixture of glue and solidifying agent is obtained, wherein the caliber of the pouring mouth of the injection device is 2-5 mm and the pouring speed 5-10 g/s.

Embodiment 5: The process according to Embodiment 3, which is characterized in that the thickness of the sidewall of the groove is 0.5-5 mm, and the width of the groove is 5-10 mm.

Having thus described various illustrative embodiments of the present invention and some of its advantages and optional features, it will he apparent that such embodiments are presented by way of example only and are not by way of limitation. Those skilled in the art could readily devise alternations and improvements on these embodiments, as well as additional embodiments, without departing from the spirit and scope of the invention. All such modifications are within the scope of the invention as claimed.

The invention claimed is:

1. A lighting article comprising (1) an elongated structure having a groove along the elongation direction, (2) a solid matrix fitted into the groove, wherein 60-98% percent of the surface area of the solid matrix is chemically bonded to the elongated structure, and (3) a light-emitting strip embedded in the solid matrix;
   wherein the light-emitting strip comprises two or more light-emitting diodes each of which is encapsulated with an encapsulant; and
   wherein the light refractive indexes of the elongated structure, the solid matrix and the encapsulant are R1, R2 and R3 respectively, and R1>R3>R2.

2. The lighting article according to claim 1, wherein 70-98% percent of the surface area of the solid matrix is chemically bonded to the elongated structure.

3. The lighting article according to claim 1, wherein 80-98% percent of the surface area of the solid matrix is chemically bonded to the elongated structure.

4. The lighting article according to claim 1, wherein at least 80% of the total light output emitted from the article has passed continuously through the encapsulant, the solid matrix and the elongated structure.

5. The lighting article according to claim 1, further comprising one or more vacuum suction cups for mounting the elongated structure on a smooth surface.

6. The lighting article according to claim 1, wherein R2 is in the range from 1.30-1.49, and R1 and R3 are independently of each other in the range from 1.50 to 1.70.

7. The lighting article according to claim 6, wherein R2=1.43, R1=1.58, and R3=1.546.

8. The lighting article according to claim 1, wherein the encapsulant, the solid matrix and the elongated structure are independently of each other made of a transparent material.

9. The lighting article according to claim 1, wherein the encapsulant, the solid matrix and the elongated structure are independently of each other comprises a material selected from the group consisting of silicone resin, polycarbonate resin, phenol formaldehyde resin, epoxy resin, acrylonitrile butadiene styrene (ABS), polyester resin, polyethylene, polypropylene, polystyrene, acrylic resin, polyethylene terephthalate, polyethylene terenaphthalate, polybutylene terephthalate, polyethersulfone, polyetheretherketone, polyimide, polyetherimide, cellulose triacetate resin, polyacrylate resin, polysulfone resin, a fluoride resin, polyvinyl acetate, alkyd resin, polyurethane resin, vinyl chloride resin, polybutyl methacrylate, polymethyl methacrylate (PMMA), parylene, fluorinated polymer, polyphthalamide (PPA), quartz, glass, silica, alumina, and mixture thereof.

10. The lighting article according to claim 9, wherein the encapsulant, the solid matrix and the elongated structure are independently of each other comprises a refractive index modifier.

11. The lighting article according to claim 1, wherein the elongated structure comprises a material selected from the group consisting of polycarbonate resin, acrylonitrile butadiene styrene (ABS), polymethylmethacrylate (PMMA), acrylic resin, polyester resin, a silicone resin, polypropylene resin, glass, silica, and alumina.

12. The lighting article according to claim 1, wherein the encapsulant comprises a material selected from the group consisting of silicone resin, epoxy resin, glass resin, acrylics, and polyimides.

13. The lighting article according to claim 1, wherein the solid matrix comprises epoxy resin or phenol formaldehyde resin.

14. The lighting article according to claim 1, wherein the light-emitting strip further comprises an additional electronic component to control the lighting effect of the diodes.

15. The lighting article according to claim 14, wherein the additional electronic component is a flash control integrated circuit (IC).

16. The lighting article according to claim 1, which emits light of different colors in a variable manner.

17. The lighting article according to claim 1, wherein the encapsulant, the solid matrix and the elongated structure are independently of each other doped with phosphor particles.

18. A process of producing a lighting article, comprising
   (i) providing an elongated structure having a groove along the elongation direction;
   (ii) placing a light-emitting strip inside the groove, wherein the light-emitting strip comprises two or more light-emitting diodes each of which is encapsulated with an encapsulant;

(iii) filling the groove with a liquid material so that light-emitting strip is immersed in the liquid material; and (iv) solidifying the liquid material into a solid matrix so that the light-emitting strip is embedded in said solid matrix, and the solid matrix is fitted into the groove with 60-98% percent of the surface area thereof being chemically bonded to the elongated structure, wherein the light refractive indexes of the elongated structure, the solid matrix and the encapsulant are $R1$, $R2$ and $R3$ respectively, and $R1>R3>R2$.

* * * * *